(12) United States Patent
Sturrock et al.

(10) Patent No.: US 7,882,200 B2
(45) Date of Patent: Feb. 1, 2011

(54) METHOD AND APPARATUS FOR DISTRIBUTION OF DATA AMONG COMPUTING RESOURCES

(75) Inventors: Andrew G. Sturrock, London (GB); Brian J. Hascup, Allendale, NJ (US)

(73) Assignee: Bank of America Corporation, Charlotte, NC (US)

( * ) Notice: Subject to any disclaimer, the term of this patent is extended or adjusted under 35 U.S.C. 154(b) by 559 days.

(21) Appl. No.: 11/589,572

(22) Filed: Oct. 30, 2006

(65) Prior Publication Data
US 2008/0104197 A1 May 1, 2008

(51) Int. Cl.
*G06F 15/16* (2006.01)
(52) U.S. Cl. ...................................... 709/217
(58) Field of Classification Search ........................ None
See application file for complete search history.

(56) References Cited

U.S. PATENT DOCUMENTS

| | | | | |
|---|---|---|---|---|
| 6,457,047 | B1 * | 9/2002 | Chandra et al. | 709/217 |
| 6,862,689 | B2 * | 3/2005 | Bergsten et al. | 714/4 |
| 7,133,905 | B2 * | 11/2006 | Dilley et al. | 709/219 |
| 7,283,935 | B1 | 10/2007 | Pritchard et al. | |
| 2006/0005181 | A1 | 1/2006 | Fellenstein et al. | |
| 2006/0195508 | A1 | 8/2006 | Bernardin et al. | |

OTHER PUBLICATIONS

Li Wenzhong et al., "Coordinated Placement and Replacement for Grid-Based Hierarchical Web Caches", Grid and Cooperative Computing—GCC Lecture Notes in Computer Sciences, LNCS, Springer-Verlag, BE, vol. 3795, Jan. 1, 2005, pp. 430-435, XP019024946, ISBN: 978-3-540-30510-1, p. 430-p. 433

Yonny Cardenas et al., "Uniform Distributed Cache Service for Grid Computing", Database and Experts Systems Applications, 2005, Proceedings, Sixteenth International Workshop on Copenhagen, Denmark Aug. 22-26, 2005, Piscataway, NJ, USA, IEE, Aug. 22, 2005, pp. 351-355, XP010835616, ISBN: 978-0-7695-2424-5, abstract, p. 353-p. 354.

(Continued)

*Primary Examiner*—Ario Etienne
*Assistant Examiner*—Clayton R Williams
(74) *Attorney, Agent, or Firm*—Michael A. Springs; Moore & Van Allen PLLC

(57) ABSTRACT

A method and apparatus for distribution of data among computing resources are disclosed. A data provider system architecture for "grid" computing resources can include a plurality of data providers. At least some of the data providers each have an associated cache for storing data to provide the data to the engines. The grid computing network interconnects the plurality of data providers and the engines. A data provider director (DPD) determines the selected data provider with respect to providing the data from the cache to a particular engine. The DPD may also provide an alternate data provider. In some embodiments, a data provider may have both an internal and external cache. Such an external cache may serve more than one data provider, for example, multiple data providers in a locale interconnected by a local area network (LAN).

15 Claims, 10 Drawing Sheets

OTHER PUBLICATIONS

Jia Wang, "A Survery of Web Caching Schemes for the Internet", Computer Communication Review, ACM, New York, NY, US, vol. 29, No. 5, Oct. 1, 1999, pp. 36-46, XP002461589, ISSN: 0146-4833, p. 38-p. 42.

Bank of America Corporation, PCT International Search Report, issued in corresponding International Patent Application No. PCT/US2007/082930, Jun. 4, 2008.

Bank of America Corporation, PCT Written Opinion, issued in corresponding International Patent Application No. PCT/US2007/082930, Jun. 4, 2008.

Bank of America Corporation, PCT International Preliminary Report on Patentability, issued in corresponding International Application No. PCT/US2007/082930, May 14, 2009.

* cited by examiner

| Case # 01-A: | start of time; one engine; one broker; NO event; assign to home broker; no home broker now; can't default | | | | | | | | | | |
|---|---|---|---|---|---|---|---|---|---|---|---|
| Table engine stats | | | | Table engine events | | | | Table machine utilization | | | |
| @epoch_5m_slice | engine_id | cpu_utilizati | ds_cpu_utilization | @epoch_5m_slice | engine_id | broker_id | event | @epoch_5m_slice | broker_id | machine_id | machine_util | grid_machin | portion |
| 0 | 0 | 60% | 48% | | | | | 0 | 4 | 0 | 60% | 48% | 1 |

| Case # 01-B: | start of time; one engine; one broker; one event | | | | | | | | | | |
|---|---|---|---|---|---|---|---|---|---|---|---|
| Table engine stats | | | | Table engine events | | | | Table machine utilization | | | |
| @epoch_5m_slice | engine_id | cpu_utilizati | ds_cpu_utilization | @epoch_5m_slice | engine_id | broker_id | event | @epoch_5m_slice | broker_id | machine_id | machine_util | grid_machin | portion |
| 0 | 0 | 60% | 48% | 0 | 0 | 1 | 0 | 0 | 1 | 0 | 60% | 48% | 1 |

| Case # 02: | next time slice; one engine, one broker, no new event | | | | | | | | | | |
|---|---|---|---|---|---|---|---|---|---|---|---|
| Table engine stats | | | | Table engine events | | | | Table machine utilization | | | |
| @epoch_5m_slice | engine_id | cpu_utilizati | ds_cpu_utilization | @epoch_5m_slice | engine_id | broker_id | event | @epoch_5m_slice | broker_id | machine_id | machine_util | grid_machin | portion |
| 0 | 0 | 60% | 48% | 0 | 0 | 1 | 0 | 0 | 1 | 0 | 60% | 48% | 1 |
| 1 | 0 | 50% | 40% | | | | | 1 | 1 | 0 | 50% | 40% | 1 |

| Case # 03: | next time slice; one engine, one broker, two events on same broker | | | | | | | | | | |
|---|---|---|---|---|---|---|---|---|---|---|---|
| Table engine stats | | | | Table engine events | | | | Table machine utilization | | | |
| @epoch_5m_slice | engine_id | cpu_utilizati | ds_cpu_utilization | @epoch_5m_slice | engine_id | broker_id | event | @epoch_5m_slice | broker_id | machine_id | machine_util | grid_machin | portion |
| 0 | 0 | 60% | 48% | 0 | 0 | 1 | 0 | 0 | 1 | 0 | 60% | 48% | 1 |
| 1 | 0 | 50% | 40% | 2 | 0 | 1 | 1 | 1 | 1 | 0 | 50% | 40% | 1 |
| 2 | 0 | 20% | 15% | 2 | 0 | 1 | 0 | 2 | 1 | 0 | 20% | 15% | 1 |

| Case # 04: | next time slice; one engine, one broker, three events on same broker; last event is logout | | | | | | | | | | |
|---|---|---|---|---|---|---|---|---|---|---|---|
| Table engine stats | | | | Table engine events | | | | Table machine utilization | | | |
| @epoch_5m_slice | engine_id | cpu_utilizati | ds_cpu_utilization | @epoch_5m_slice | engine_id | broker_id | event | @epoch_5m_slice | broker_id | machine_id | machine_util | grid_machin | portion |
| 0 | 0 | 60% | 48% | 0 | 0 | 1 | 0 | 0 | 1 | 0 | 60% | 48% | 1 |
| 1 | 0 | 50% | 40% | 2 | 0 | 1 | 1 | 1 | 1 | 0 | 50% | 40% | 1 |
| 2 | 0 | 20% | 15% | 3 | 0 | 1 | 0 | 2 | 1 | 0 | 20% | 15% | 1 |
| 3 | 0 | 30% | 28% | 3 | 0 | 1 | 1 | 3 | 1 | 0 | 30% | 28% | 1 |
| | | | | 3 | 0 | 1 | 0 | | | | | | |

Case # 05: next time slice - one engine, one broker, no new event

Table engine stats

| @epoch_5m_slice | engine_id | cpu_utilization | ds_cpu_utilization |
|---|---|---|---|
| 0 | 0 | 60% | 48% |
| 1 | 0 | 50% | 40% |
| 2 | 0 | 20% | 15% |
| 3 | 0 | 30% | 28% |
| 4 | 0 | 25% | 0% |

Table engine events

| @epoch_5m_slice | engine_id | broker_id | event |
|---|---|---|---|
| 0 | 0 | 1 | 0 |
| 2 | 0 | 1 | 1 |
| 3 | 0 | 1 | 0 |
| 3 | 0 | non-grid | 1 |

Table machine utilization

| epoch_5m_slice | broker_id | machine_id | machine_util | grid_machin | portion |
|---|---|---|---|---|---|
| 0 | 1 | 0 | 60% | 48% | 1 |
| 1 | 1 | 0 | 50% | 40% | 1 |
| 2 | 1 | 0 | 20% | 15% | 1 |
| 3 | 1 | 0 | 30% | 28% | 1 |
| 4 | non-grid | 0 | 25% | 0% | 1 |

← 608

Case # 06: next time slice - one engine, one broker, two new events: same broker - logon and then logoff Table engine stats

| @epoch_5m_slice | engine_id | cpu_utilization | ds_cpu_utilization |
|---|---|---|---|
| 0 | 0 | 60% | 48% |
| 1 | 0 | 50% | 40% |
| 2 | 0 | 20% | 15% |
| 3 | 0 | 30% | 28% |
| 4 | 0 | 25% | 0% |
| 5 | 0 | 15% | 13% |

Table engine events

| @epoch_5m_slice | engine_id | broker_id | event |
|---|---|---|---|
| 0 | 0 | 1 | 0 |
| 2 | 0 | 1 | 1 |
| 3 | 0 | 1 | 0 |
| 3 | 0 | 1 | 1 |
| 5 | 0 | 1 | 0 |
| 5 | 0 | 1 | 1 |

Table machine utilization

| epoch_5m_slice | broker_id | machine_id | machine_util | grid_machin | portion |
|---|---|---|---|---|---|
| 0 | 1 | 0 | 60% | 48% | 1 |
| 1 | 1 | 0 | 50% | 40% | 1 |
| 2 | 1 | 0 | 20% | 15% | 1 |
| 3 | 1 | 0 | 30% | 28% | 1 |
| 4 | non-grid | 0 | 25% | 0% | 1 |
| 5 | 1 | 0 | 15% | 13% | 1 |

← 608

Case # 07: next time slice - one engine, one broker, three new events: logon and eventually (last event on that broker) logoff from a broker, logon to another broker Table engine stats

| @epoch_5m_slice | engine_id | cpu_utilization | ds_cpu_utilization |
|---|---|---|---|
| 0 | 0 | 60% | 48% |
| 1 | 0 | 50% | 40% |
| 2 | 0 | 20% | 15% |
| 3 | 0 | 30% | 28% |
| 4 | 0 | 25% | 0% |
| 5 | 0 | 15% | 13% |
| 6 | 0 | 24% | 20% |

Table engine events

| @epoch_5m_slice | engine_id | broker_id | event |
|---|---|---|---|
| 0 | 0 | 1 | 0 |
| 2 | 0 | 1 | 1 |
| 3 | 0 | 1 | 0 |
| 3 | 0 | 1 | 1 |
| 5 | 0 | 1 | 0 |
| 5 | 0 | 1 | 1 |
| 6 | 0 | 1 | 0 |
| 6 | 0 | 1 | 1 |
| 6 | 0 | 2 | 0 |

Table machine utilization

| epoch_5m_slice | broker_id | machine_id | machine_util | grid_machin | portion |
|---|---|---|---|---|---|
| 0 | 1 | 0 | 60% | 48% | 1 |
| 1 | 1 | 0 | 50% | 40% | 1 |
| 2 | 1 | 0 | 20% | 15% | 1 |
| 3 | 1 | 0 | 30% | 28% | 1 |
| 4 | non-grid | 0 | 25% | 0% | 1 |
| 5 | 1 | 0 | 15% | 13% | 1 |
| 6 | 1 | 0 | 12% | 10% | 0.5 |
| 6 | 2 | 0 | 12% | 10% | 0.5 |

← 608

METHOD AND APPARATUS FOR DISTRIBUTION OF DATA AMONG COMPUTING RESOURCES

CROSS-REFERENCE TO RELATED APPLICATION

Much of what is disclosed in the present application is also disclosed in commonly assigned U.S. patent application Ser. No. 11/589,657, now issued U.S. Pat. No. 7,283,935, entitled "Method and Apparatus for Monitoring Grid-Based Computing Resources," filed on even date herewith, the entire disclosure of which is incorporated herein by reference.

BACKGROUND

Everyday around the world, businesses, universities, governments and other organizations need to do complex calculations in the course of scientific research, financial or behavioral modeling, forecasting, risk determination, business planning and other endeavors. Such calculations can consume an enormous amount of computing resources. Historically supercomputers were used for this sort of processing. However, as the demands for this type of processing grow exponentially, "grid" computing is being used as an alternative to expensive supercomputers.

Grid computing, as the term is used herein, simply stated, is a form of distributed computing that allows a large set of processors or engines in multiple geographies to work together as a collection or "grid." A processor, for example, may be the central processing unit (CPU) in a personal computer, workstation, or server. An "engine" is the processing core of such a computing platform, which in its simplest form may be a single CPU, or may be multiple processors working together in the same platform. Grid distribution software, such as that developed and licensed by Datasynpse, Inc. of New York, N.Y., U.S.A. is applied to farm out the individual calculations, each of which is relatively small, across thousands of processors or engines. Each one performs its calculation and returns the answers to the requesting application for consolidation and reporting.

In some grid computing systems the distribution of work across the grid is managed by entities called "brokers" and data needed by the engines on the grid is housed at and retrieved from data providers, machines which store input data needed for calculations. Thus, at least some modern computing grids include engines (processors or CPU's), brokers and data providers, all distributed across the grid.

SUMMARY

Example embodiments of the present invention provide a way to reduce network overhead in providing data to remote engines for computations being performed in a grid-based computing system. According to example embodiments, data, once retrieved is cached for future use, minimizing further network calls.

In at least some embodiments, a data provider system architecture according to the invention can includes a plurality of data providers. At least some of the data providers each have an associated cache for storing data to provide the data to the engines. The grid computing network interconnects the plurality of data providers and the engines. A data provider director (DPD) determines the selected data provider with respect to providing the data from the cache to a particular engine. The DPD may also provide an alternate data provider. In some embodiments, a data provider may have both an internal and external cache. Such an external cache may serve more than one data provider, for example, multiple data providers in a locale interconnected by a local area network (LAN).

In example embodiments, when a request for data is received from an engine at the selected data provider, a cache is checked, and if possible, data is provided to the engine from the cache when the data is present in the cache. If both an internal and external cache are present, the data provider can check the internal cache first, followed by its external cache. In some embodiments, if both caches miss, the data can be obtained from an alternate data provider, which is also assigned by the DPD. Finally, the data can be obtained from a data source when the data is not present at the alternate data provider. In at least some embodiments, a lease can be obtained for the data source when the data source is single-threaded.

In example embodiments, the invention can be implemented by means of a computer program product executing on one or more computer systems and/or entities. These computer systems and/or entities can include the data providers, data provider director, caches, and any other systems of computing platforms connected to the network for the grid-based computing system.

BRIEF DESCRIPTION OF THE DRAWINGS

FIG. 6 illustrates a list of example tables of information that might be stored in the process of carrying out the process of FIG. 5. Each table in the list corresponds to a time slice in a progression of time. For clarity, FIG. 6 is presented as FIG. 6A and FIG. 6B.

DETAILED DESCRIPTION OF THE INVENTION

Figure 1:
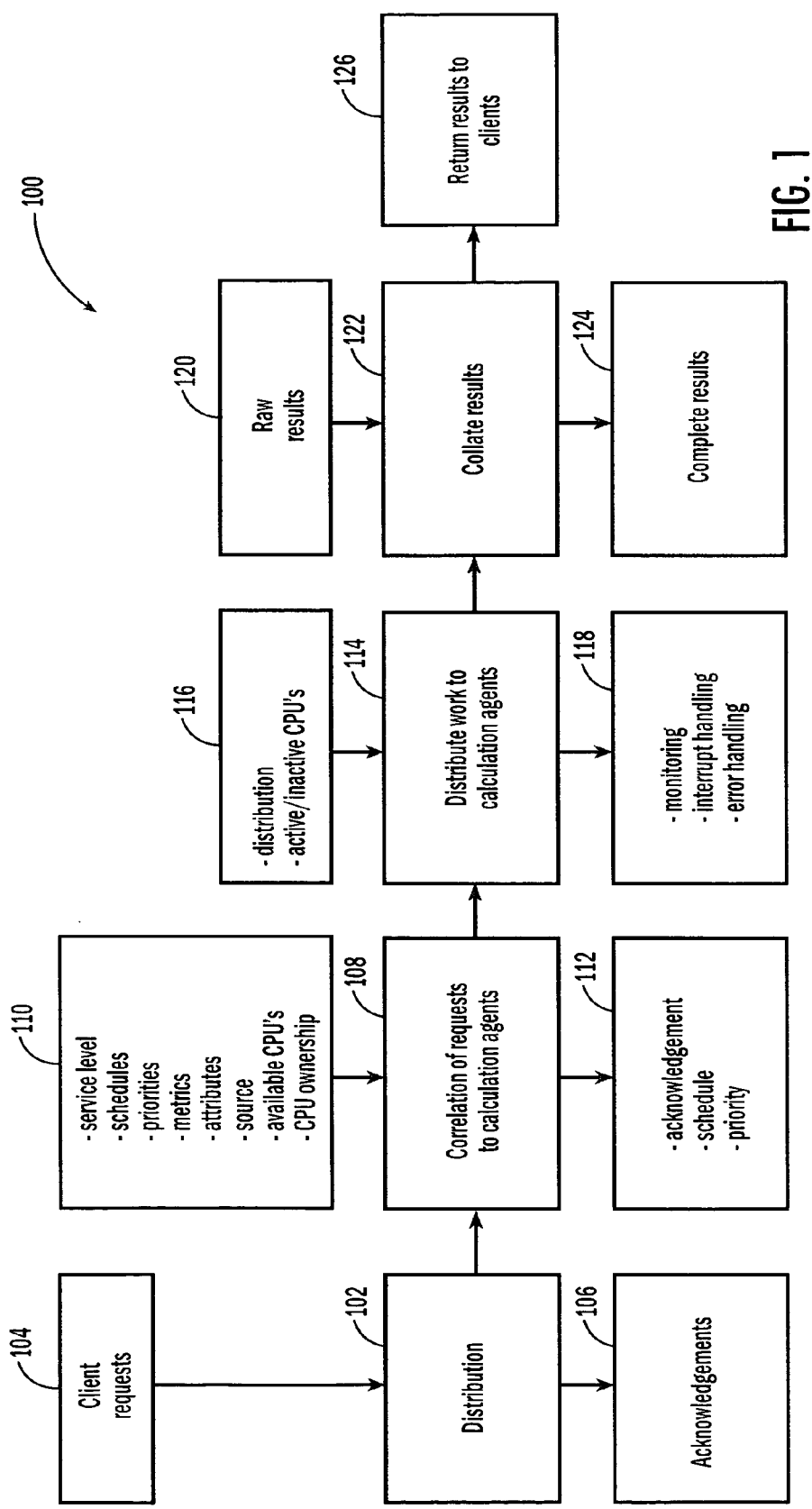
FIG. 1 is a process diagram that shows generally how work is managed in a grid-based computing system like that in which the invention is used.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, or semiconductor system, apparatus, or device. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

In the context of this document, a computer usable or computer readable medium may be any medium that can contain, or store the program for use by or in connection with the instruction execution system, apparatus, or device.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Turning to FIG. 1, a work flow diagram is shown that illustrates the operation of a distributed, grid-based, computing system and network with which the invention might find use. Work flow diagram 100 is shown as a series of stages illustrated as process blocks. Work flow 100 begins with distribution 102. Distribution 102 takes client requests 104 as input and sends appropriate acknowledgements 106. Requests are correlated with calculation agents at block 108. Inputs 110 for these decisions can include service level agreements, default computing schedules, availability and priority, metrics and other attributes, and the source of requests and ownership of the computing resources, such as the CPU's that will do the actual calculations. This stage of the work flow outputs appropriate acknowledgements, schedules, and priorities at block 112.

Still referring to FIG. 1, work flow stage 114 includes the distribution of work to calculation agents (engines and/or processors). Inputs 116 to this stage include geographic distribution and status (active vs. inactive) of the processors to be used. Monitoring, error handling, and interrupt handling are controlled by this distribution stage as shown at block 118. Raw result data 120 is collated at block 122 to produce complete, formatted results at block 124. Finally, results are returned to requesting clients at block 126.

Figure 2:
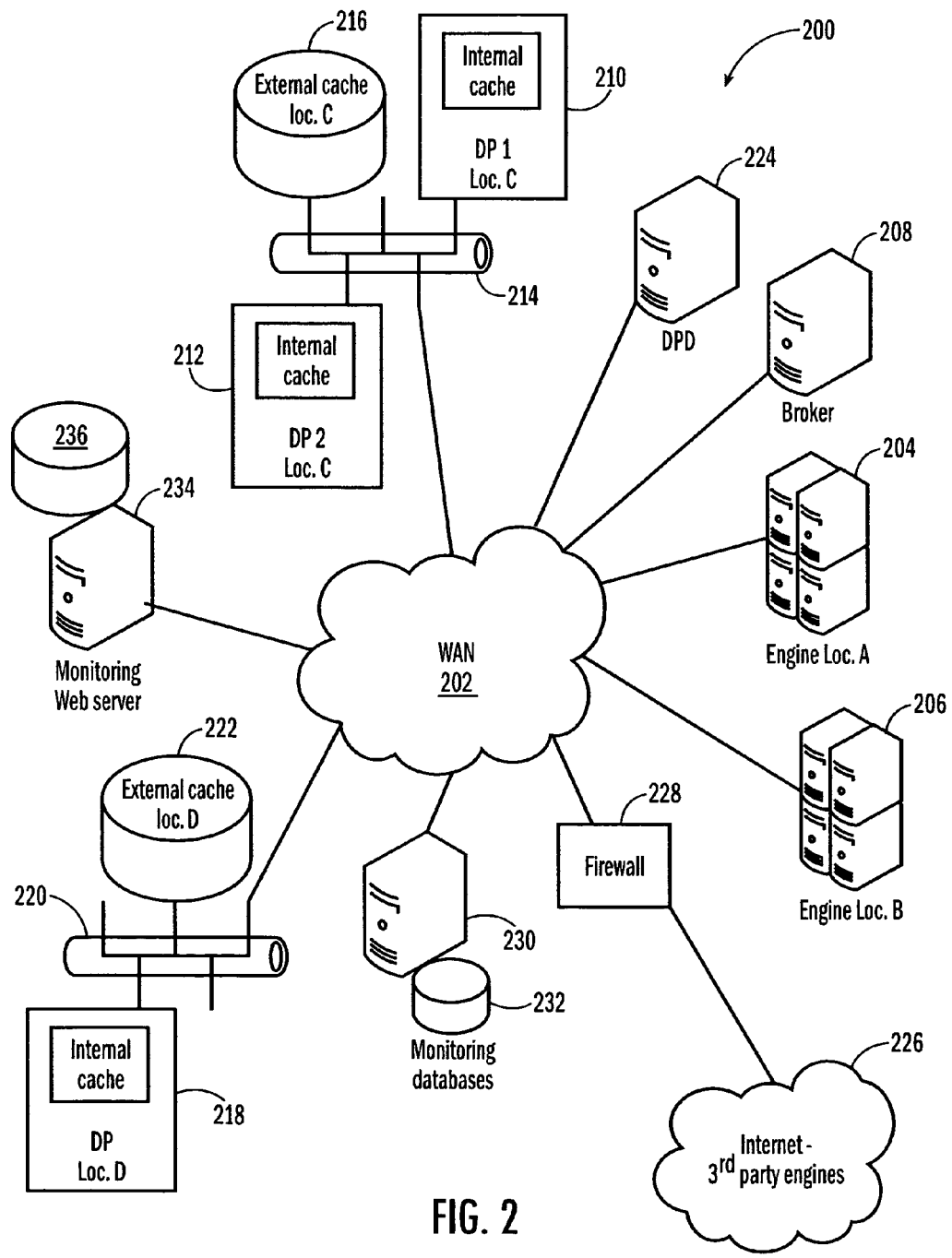
FIG. 2 is a network block diagram that illustrates the operating environment and entities used in example embodiments of the invention.

FIG. 2 is a network block diagram that illustrates one example computing grid architecture according to embodiments of the present invention. It cannot be overemphasized that the architecture of FIG. 2 is but one example of a distributed computing environment according to the invention. Grid system 200 of FIG. 2 makes is of an enterprise wide area network (WAN), 202, to communicate between locations. Engine 204 is physically located at a location that is designated herein simply as location "A." Likewise, engine 206 is located at location "B." Broker 208 directs the work of engines 204 and 206. A first data provider, 210 and a second DP, 212 are physically located at a location which has been designated location "C." These data providers are connected via local area network (LAN) 214, and each includes an internal cache for data that is being used by the engines. An external cache for location C, 216, is also connected to LAN 214.

Still referring to FIG. 2, system 200 includes another location, location "D" that includes a single DP, 218, which also contains an internal cache. This DP is also connected to an external cache, 220, for location D. LAN 222 interconnects the DP and external cache at location D, and could be used to add additional data providers to the grid if needed. Data provider director (DPD) 224 directs the provision of data by the data providers using the caches. It should be noted that data is often original obtained from data sources (not shown) that do not serve as data providers, but can be accessed by the data providers, as described in greater detail with respect to FIG. 3. Finally, WAN 202 is connected to the external Internet, 226 through firewall 228; so that the grid can be extended if need be to third party engines.

System 200 of FIG. 2 also includes monitoring functions. Database server 230 houses the necessary databases on media 232. Additionally, monitoring Web server 234 provides the algorithms to aggregate and normalize data for use in determining the various metrics being monitored and the scripts and functions to report this data via the Web. These algorithms, scripts, and the like can be implemented with computer program products or computer program code that resides on fixed media 236. Multiple servers can be used to carry out these functions, but only these two are shown for clarity. For example, the Web server could simply be used for reporting, while the other scripts and algorithms are housed on the same server as the databases, or in another server altogether.

The primary purpose of the cache arrangement and architecture shown above and described in further detail below is to minimize the network overhead of providing data to remote computing engines. This reduction can be achieved by ensuring, whenever possible, that each piece of data is retrieved over the network to a group of data providers at most once. The data is then cached so further network calls are minimized.

Figure 3:
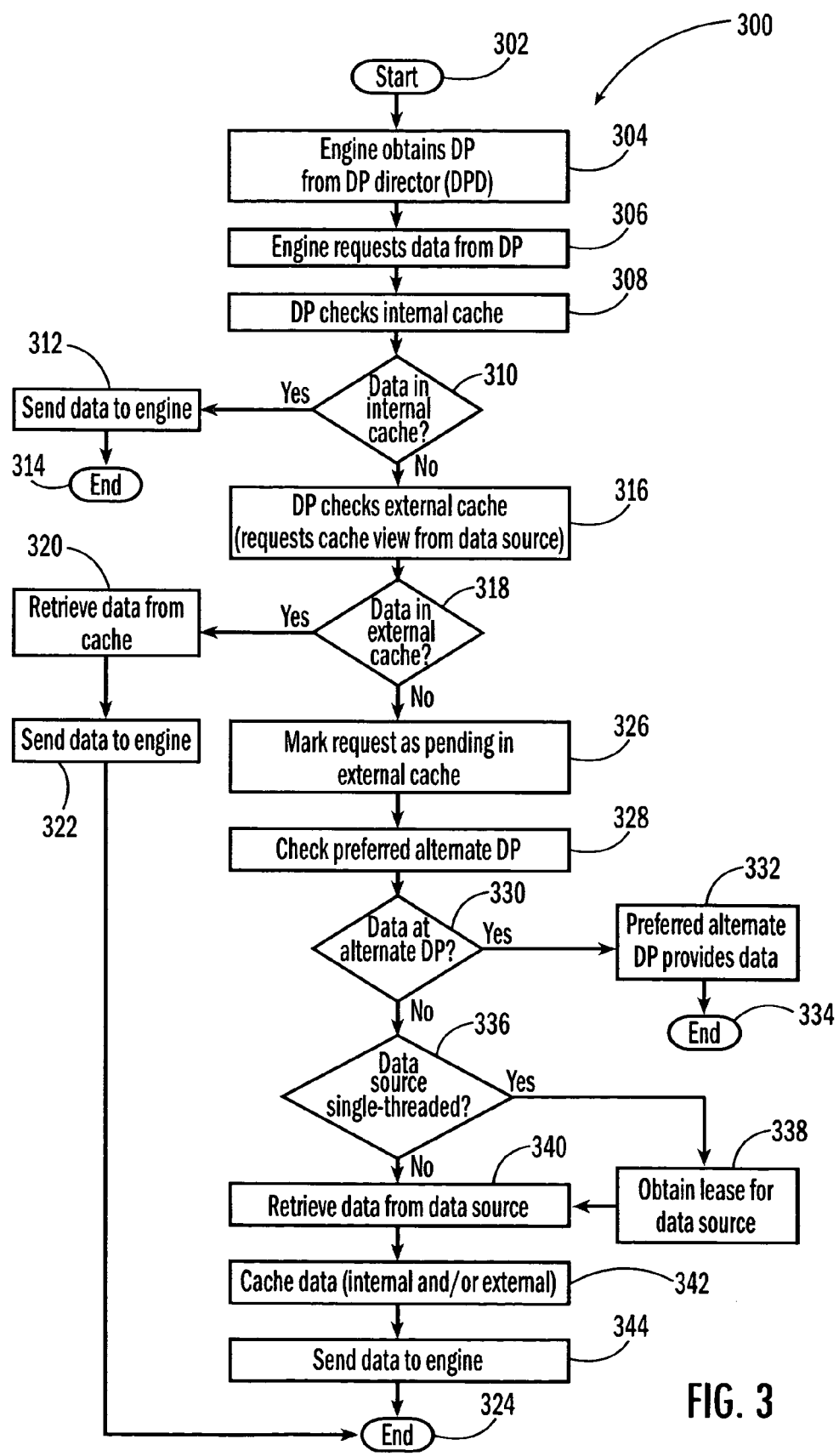
FIG. 3 is a flowchart that illustrates a process of handling requests to data providers in a grid-based computing system according to example embodiments of the invention.

FIG. 3 provides a flowchart of process 300 that is used in managing the data provider architecture illustrated in FIG. 2 according to example embodiments of the invention. As the case with most flowcharts, the process is illustrated as a series of process or sub-process blocks. Process 300 begins at block 302 when an engine needs data. The engine obtains the identity of the best data provider (DP) from the data provider director (DPD) at block 304. In example embodiments, Java can be used to carry out these processes. The DPD locates the best DP at the time of the request and returns it. The best DP is one that is pingable in the same location as, or in a failover location of, the engine. If the DPD returns a non-optimal DP, the engine will periodically request a better one until an optimal DP is identified. Within a location, DP's are handed out using round-robin load balancing.

Still referring to FIG. 3, the engine requests the needed data from the DP at block 306. A DP will only go to the ultimate data source if the DP's location is the same as the location of the data source. If not, the DP will ask the DPD for a DP in the preferred lookup location and pass the data access request to that DP. The final destination DP checks its internal cache at block 308. A determination is made at block 310 as to whether the data is present in the internal cache. If so, it is sent to the engine at block 312 and the process ends at block 314. If the data is not present at block 310, an internal cache miss, the DP will check the external cache at block 316. All data providers at a location share an external cache in this example. A determination is made at block 318 as to whether the data is present in the local external cache. If so, the data is retrieved from the cache at block 320, sent to the requesting engine at block 322, and the process ends at block 324. If that misses as well, the DP indicates the data as "pending" at block 326 by storing a reservation key in the external cache. If another request is made to a DP at that location for the same data, the DP will notice that the item is marked as pending and it will wait for that data to appear rather than retrieve it itself. This system of indicating that data is pending can significantly reduce network bandwidth requirements.

In example embodiments, a data identifier key is used to uniquely identify a particular piece of data being used on the grid. A distinction is maintained between the data identifier key and the reservation key. The identifier key is a unique string key identifying a particular piece of data. The reservation key is a string key used when reserving the lookup (i.e. reserving the call to the data source) for that data. The data identifier keys for each piece of data are unique keys, but the same reservation key can be used for various pieces of data that are not available in the cache.

Returning to FIG. 3, once the data that is not cached is marked pending, the DP checks a preferred, alternate DP for the data at block 328, which is provided by the DPD in the manner previously discussed. If the data is at the alternate DP, it is provided to the engine at block 332 and the process ends at block 334. It should be noted that the alternate DP in this example goes through the same process now being described. If the data is not present at the alternate DP at block 330, the present DP will obtain the data from the source. Some data sources are single threaded and can therefore only support one request at a time. A determination is made at block 336 as to whether the data source for the particular request is single threaded. If so, a lease manager is invoked to obtain a "lease" to use the data source at block 338. The lease manager is set up so that a lease expires if the lease requester dies, so the resources of the data source do not stay reserved forever. In either case, the data is retrieved from the data source at block 340.

Still referring to FIG. 3, the data source is also responsible for determining if the DP should cache data internally as well as in the external cache, or if the DP should only cache data in the external cache. In either case, the data is cached at block 342. The DP then sends the data to the requesting engine at block 344. Example process 300 ends at block 324. If the data source throws an exception, the data source determines whether or not the exception should be cached by the requesting DP. If cached, then all subsequent calls to the DP for the same data will cause the same exception to be thrown without having to make an actual call back to the data source. Thus, data source exceptions are basically handled in the same manner as data.

Figure 4:
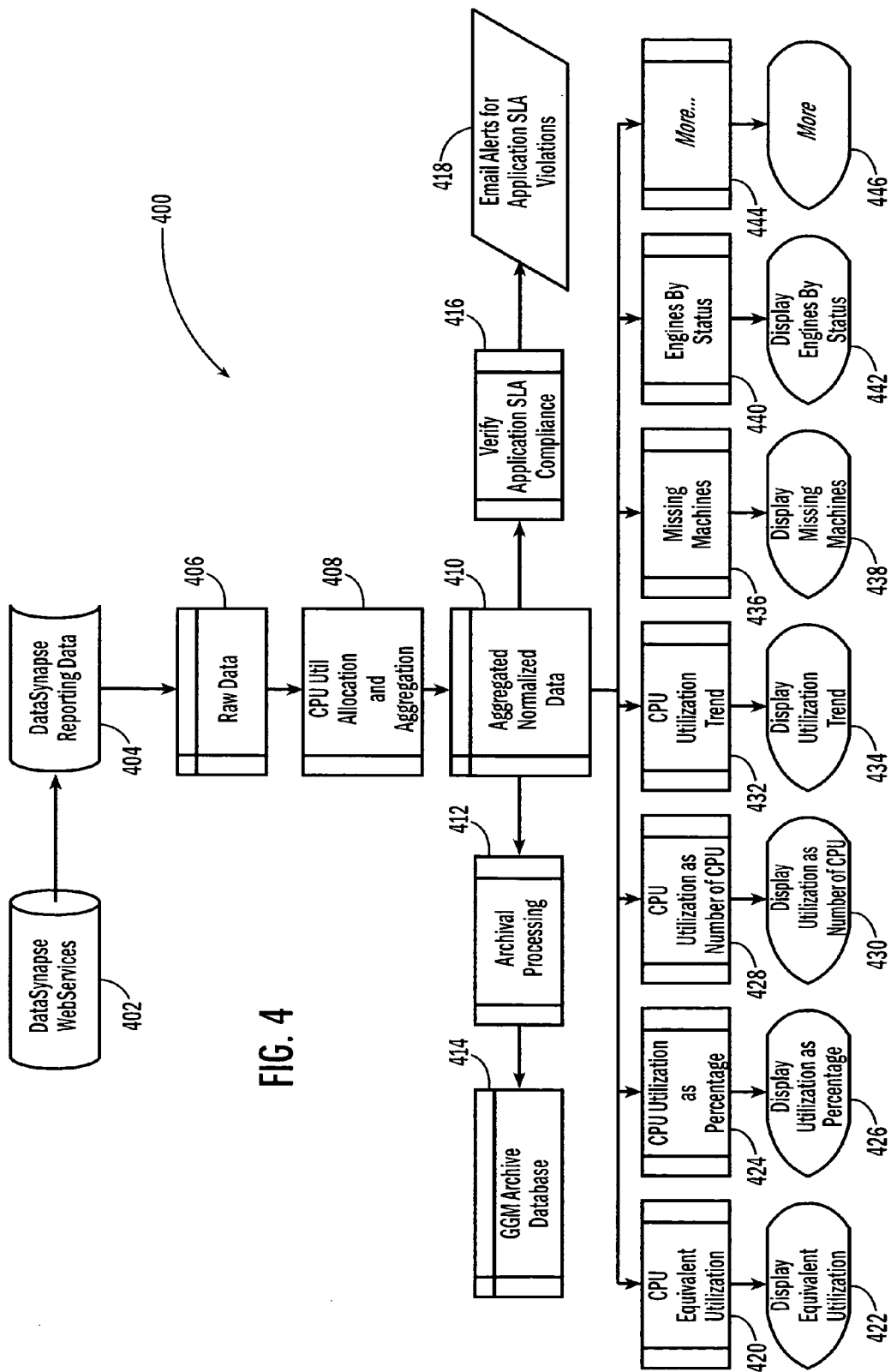
FIG. 4 is a system flow diagram that illustrates a method and system for monitoring metrics in a grid-based computing system that might be used to implement an embodiment of the invention.

FIG. 4 illustrates a system flow, 400, for monitoring grid based computing resources. System flow 400 eventually produces metrics which can be displayed to a user in order to evaluate the performance of the computing grid. In this particular example embodiment, the previously mentioned Data Synapse software is being used to distribute work on the computing grid. Data Synapse Web services 402 supply reporting data 404 to the monitoring system. This data is input as raw data 406 to a processor (CPU) utilization allocation and aggregation process (algorithm), 408. Aggregated, normalized data 410 is used for a number of purposes once it is obtained from the allocation and aggregation process, 408.

Still referring to FIG. 4, aggregated normalized data 410 is delivered to an archival processing algorithm, 412, and eventually at least a portion of the data is stored in a global grid monitor (GGM) archive data base, 414. Aggregated normalized data is also supplied to algorithm 416, which verifies application service level agreement (SLA) compliance. The SLA verification algorithm can optionally send E-mail alerts, 418, to users to alert administrators and managers that some applications are not meeting performance goals established by service level agreements. At the bottom of system flow 400, various algorithms assay metrics important to monitoring the grid computing environment, and optionally display these metrics to a user, for example, in a Web page.

The system flow of FIG. 4 illustrates a number of example metrics that can be determined and displayed for use in monitoring the grid. These metrics are shown as examples only, and the types and numbers of metrics that can be determined and displayed are highly varied, and can be engineered by those of ordinary skill in the art to meet the needs of the particular computing environment. At block 420, processor equivalent utilization is determined for display at block 422. At block 424, processor utilization as a percentage is determined for display at block 426. At block 428, utilization as the number of processors is determined for display at block 430. At block 432, a utilization trend can be determined for display at block 434. At block 436, missing machines can be determined and displayed at block 438. At block 440, engines by status can be determined, for listing in a display at block 442. Block 444 illustrates the fact that many other metrics can be determined for display at block 446.

Figure 5:
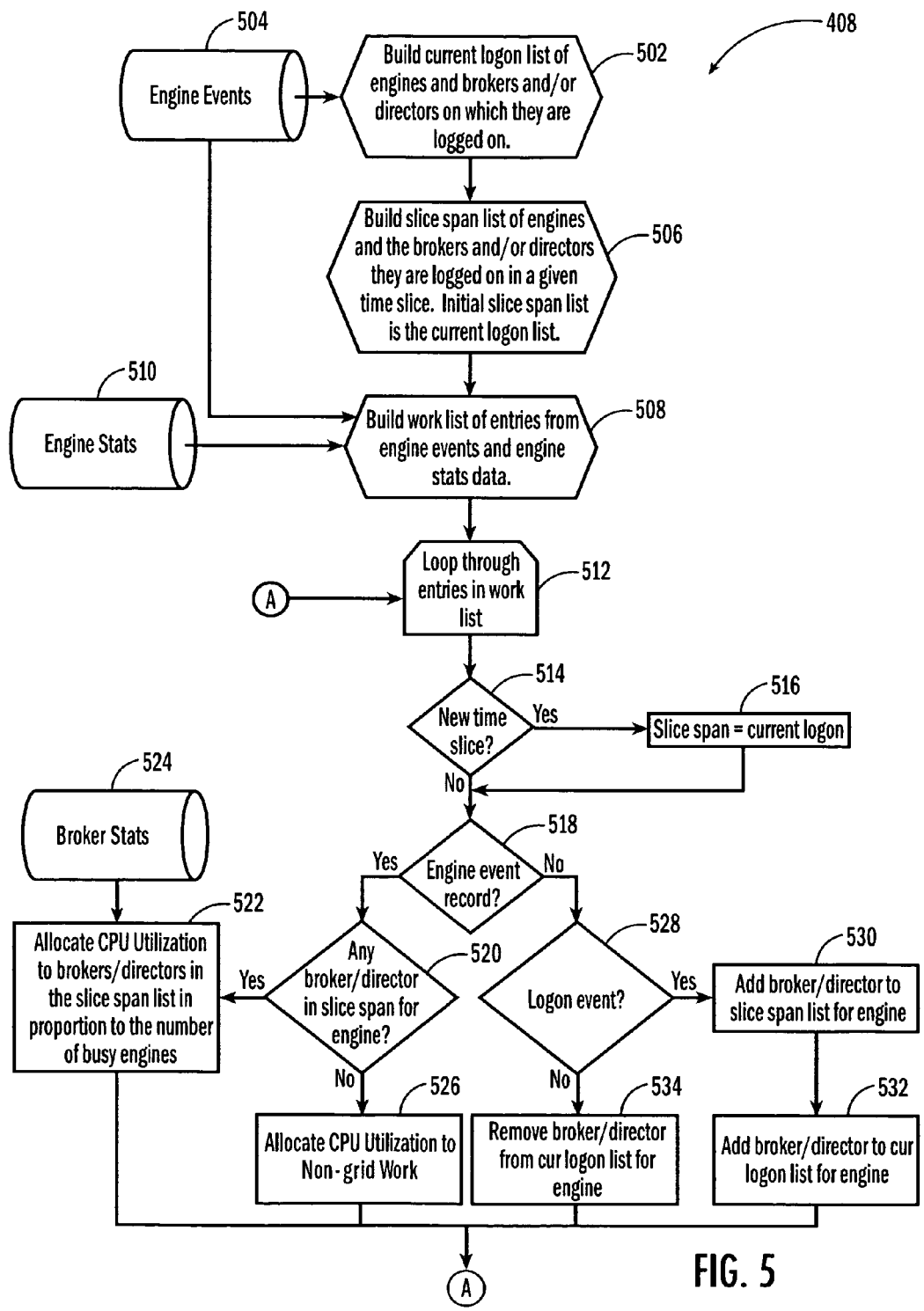
FIG. 5 is a flowchart that illustrates the creation of aggregated, normalized data in the monitoring of a gird-based computing system that is implementing an embodiment of the invention.

FIG. 5 is a flowchart which illustrates the utilization, allocation, and aggregation process, 408, of FIG. 4. At block 502 of FIG. 5, a current logon list is built for engines and brokers (and/or directors) onto which those engines are logged on. Stored engine events 504 are used to build this list. At block

506, a slice span list of engines and their brokers and/or directors is built. The initial slice span list for the initial time slice is set to the current logon list. At block 508, a work list of entries from engine events and engine statistics data is built. Data for this list is retrieved from the engine events data, 504, and engine statistics 510. The work list is sorted by time, source of the record and engine ID.

Still referring to FIG. 5, at process block 512, the entries in the work list are evaluated by looping through each one. When a new time slice begins at block 514, the span of a new time slice is set to the current logon list at block 516. A determination is made at block 518 as to whether the source of the record is from engine statistics. If so, the determination is made at block 520 as to whether any broker or director has had activity in the time slice span for that engine. If so, processor utilization is allocated at block 522 to that broker and/or director in that time slice span in proportion to the number of busy engines. In order to determine the number of busy engines, data is retrieved from stored broker statistics 524. If no broker or director is active in the time slice span at block 520, that processor utilization is allocated to non-grid work at block 526. Returning to decision block 518, the source of the record was not engine statistics, implying the source is engine events 504, a determination is made at block 528 as to whether a logon event occurred. If so, the appropriate broker and/or director is added to the slice span list for that engine at block 530 and it is added to the current logon list for that engine at block 532. Otherwise it is removed from the current log n list at block 534. At point "A," processing returns as shown to the beginning of the loop at block 512.

FIG. 6 illustrates examples of stored tables which are produced and used by the aggregation and normalization process previously discussed. FIG. 6 is presented as FIG. 6A and FIG. 6B for clarity. Table 600 of FIG. 6 includes a column of engine statistics tables, 602, a column of tables of engine events, 604, and a column of machine utilization tables, 606. Case numbers 01A and 01B correspond to the start of time for the algorithm. In case 01A, note that the percentages in the engine statistics match the utilization percentages. It can be assumed that broker number four is a broker for engine number 0. It should be noted that the first two columns are derived. In case number 1B, one event is now specified for broker number 1. Again, note that the percentages match between engine statistics and machine utilization. In FIG. 6A, case number 02, case number 03, and case number 04 all represent additional time slices based on time periods of five minutes from the epoch.

FIG. 6B is a continuation of FIG. 6A, and contains the same columns and structure. In FIG. 6B, case number 05, case number 06, and case number 07 represent additional time slices. Note that in the tables of FIG. 6B, when a machine is not logged onto any broker, it is assigned to non-grid work, as shown at 608. Also note that in case number 07, there is a split in utilization between two brokers, as highlighted by the numbers which have been encircled and connected with arrows. In this example embodiment, additional time slices are evaluated, and at the end of the loop, a complete, final table is recorded which can be used for verification purposes.

Figure 7:
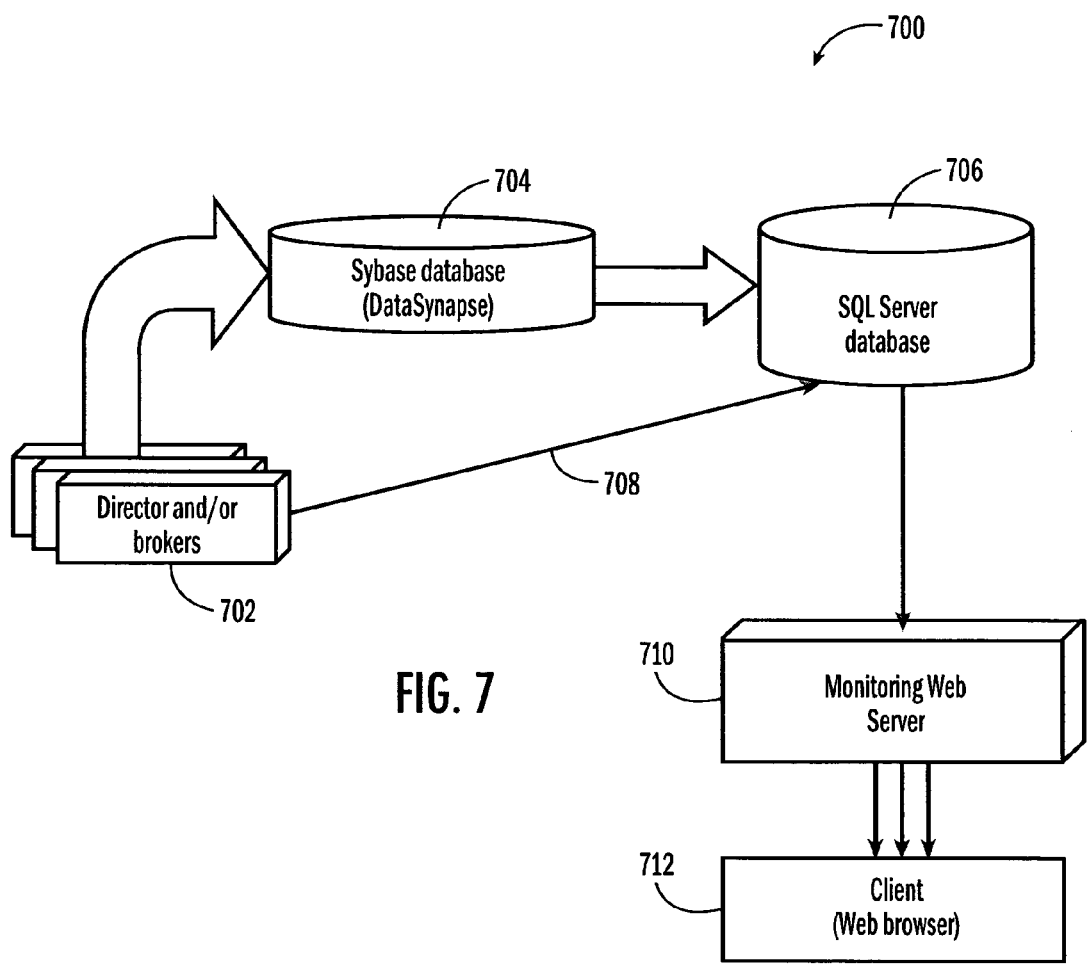
FIG. 7 is a system block diagram for the monitoring system that might be used with embodiments of the present invention.

FIG. 7 is a block diagram of a system, 700, which implements the monitoring processes previously described. In system 700, director and/or broker machines 702 send data to a first data base, 704, which in this example embodiment is a Sybase data base as maintained by the Data Synapse software previously discussed. The aggregation and normalization algorithm is applied to the raw data and aggregated, normalized data is stored in second data base 706, which in this example embodiment is an SQL server database. Directors and brokers also provide machine configuration information and web services information to database 706 through a communication path, 708. In the example embodiments described herein, monitoring Web server 710 assays and/or determines metrics and displays them in appropriate formats to a client Web browser, 712. As previously mentioned, the Web server functionality and metric determination functionality can be provided on separate servers, instead of a single server such as server 710.

In system 700 of FIG. 7, there is typically one set of databases like that shown per computing grid. Scripts can be used to provide the aggregation and normalization function, and in example embodiments these can be set to run twice an hour. A script can also be used to feed machine configuration information to the SQL server database. This configuration information typically contains data on a machine's grid, home broker's, number of logical processors, operating system, and location.

Figure 8:
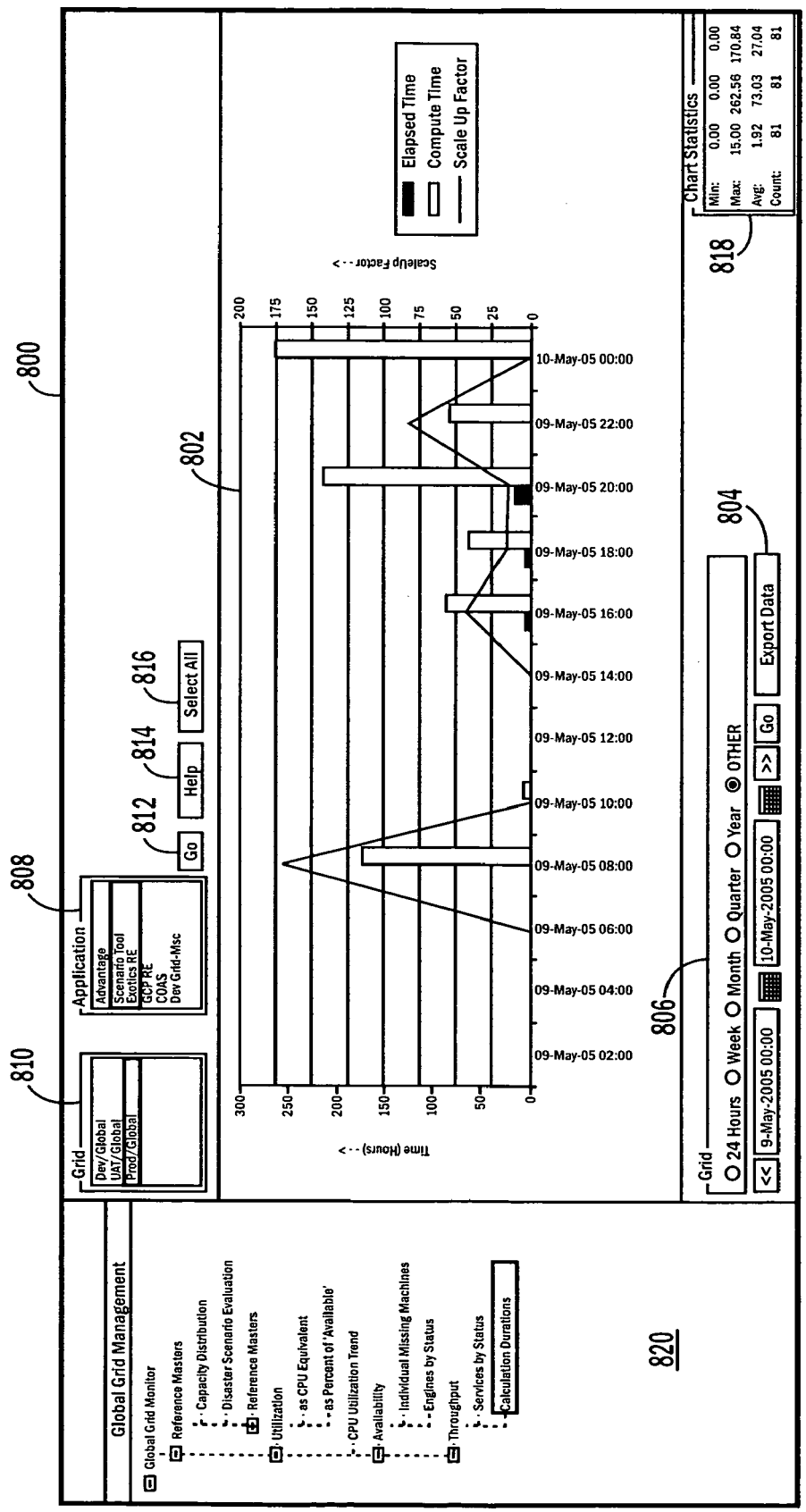
FIGS. 8 and 9 are example screenshots of displays of metrics monitored by the monitoring system of FIG. 7.
Figure 9:
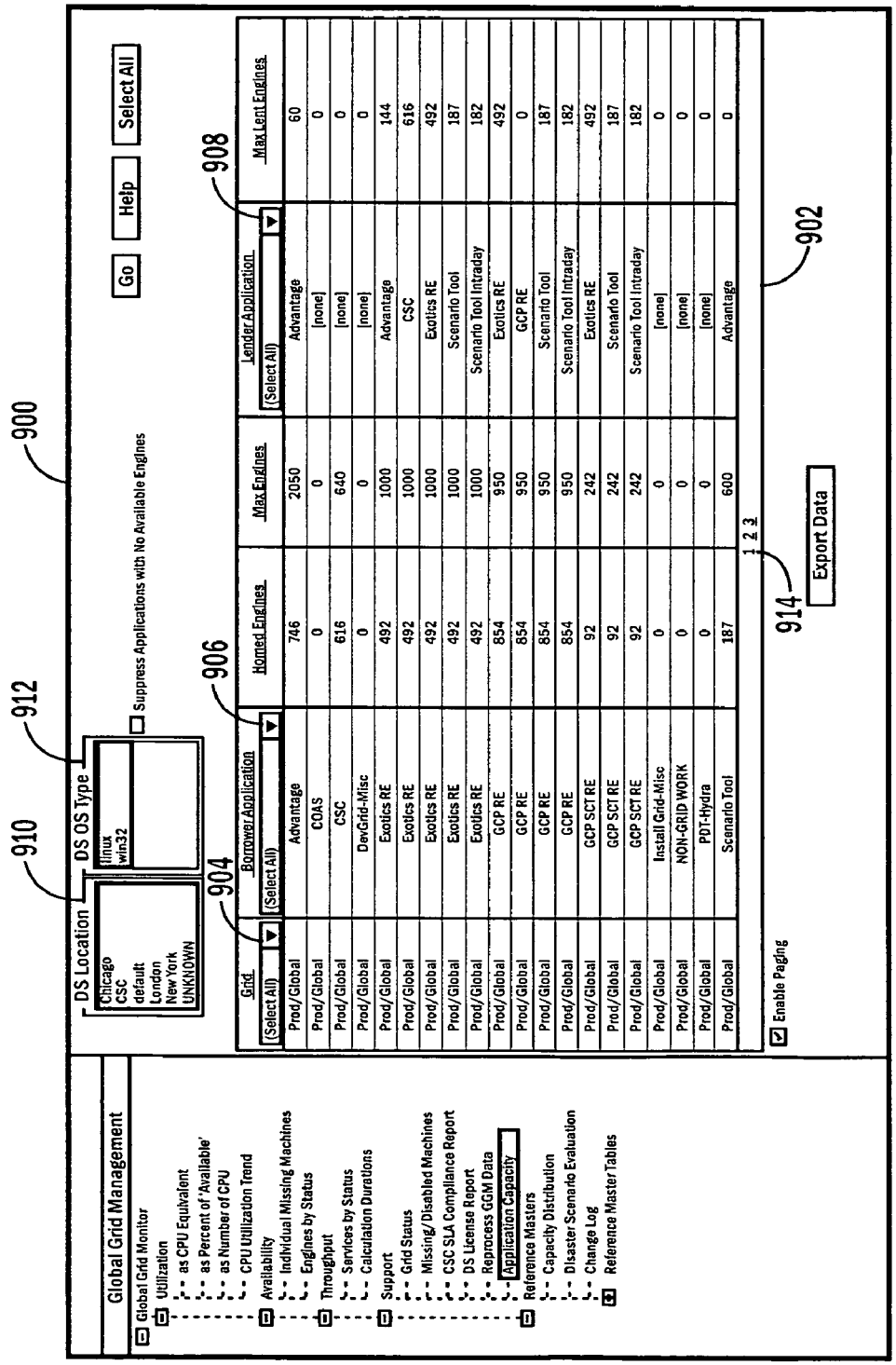

FIGS. 8 and 9 are screen shots which illustrate some of the types of displays that can be produced to monitor the grid. These screen shots are illustrative only. A tool according to the invention can be designed to produce a wide variety of displays and indications for the user, as the needs of the specific situation dictate. In example embodiments, these screens are displayed in the data area of a Web browser application running on a client computer. Turning to FIG. 8, screen 800 is shown displaying a metric of calculation duration for the processors on a grid. Graph 802 graphically displays calculations with a vertical axis of time in hours, scaled up by factors from 0 to 200, and horizontal axis of time interval. This data can be exported with button 804, and the time period which is being displayed can be changed with radio buttons 806. Specific applications can be highlighted in box 808 and a specific grid can be highlighted in box 810 in order to filter the data. Button 812 updates the display, button 814 provides access to a help file, and button 816 allows the user to select all grids and applications. Box 818 displays statistics for all of the data displayed in the chart. Box 820 displays a hierarchical tree using disclosure boxes to select various metrics to display in various categories. A user can also display reference master information, which will be discussed below.

Screen 900 of FIG. 9 displays buttons and controls which are similar to those shown in FIG. 8. One difference between FIG. 9 and FIG. 8 is that the metric displayed in FIG. 9 is that of application capacity, and this metric lends itself to displaying in tabular form. Data area 902 consists of rows and columns of information on applications, grids, and engines. Drop down boxes 904, 906, and 908 can be used to select data for specific grids and applications, otherwise, all are selected, as currently shown. Selection box 910 allows a user to select a location for the machines for which data is being displayed and box 912 allows a user to select machines with specific operating systems for display. Links 914 allow a user to select various pages of information.

The reference master information referred to above includes various tables which are available to the user for inspection, and in turn, which can be used by a grid computing system. This reference master information can include tables of user privileges, tables of authorization levels, and tables which contain notations about attributes, parameters, locations, and other critical information about computing grids in use within an enterprise. Additional reference master information can include information on operating systems, owners, locations, time zones, as well as a change log which tracks changes to the system.

As illustrative examples, additional ways of displaying useful metrics with a monitoring system according to example embodiments of the invention will now be described. As previously mentioned, processor utilization as the number of processors is another metric that could be displayed to users with an embodiment of the invention. Such a metric would represent the number of logical processors potentially available on the grid. If the previously mentioned Data Synapse software is being used, this number would be equal to the number of logical processors with each Data Synapse daemon that is reporting statistics. As previously described, a user could select owner, location, hardware type, and operating system filters as desired.

A metric of processor utilization as a processor equivalent would calculate this metric based on aggregation from machine utilization. Potentially available processors and their CPU equivalents could be used. Processing resources devoted to non-grid work could also be taken into account. Optionally, application idle capacity could also be taken into account.

A metric could be displayed for processor utilization as a percentage of potentially available processors. This method would be similar to the processor equivalent metric discussed above except that it would be expressed in potentially available terms. Those figures could be divided by potentially available processors and then converted to a percentage. A 100% line could be displayed for convenience.

A processor utilization trend could be calculated by finding the average utilization of machines aggregated up to some extended period of time relative to a time slice, for example, one day. Minimum, maximum, and average processor utilization could also be displayed.

Additional metrics that could be provided by a tool according to an embodiment of the invention include engines by status, services by status, grid status, as well as missing and/or disabled machines. Metrics could be combined into views that conveniently display more than one metric. Additionally, provisions could be made for storing such views for different users. Such options could make use of standard web browser functionality such as stored cookies, scripts, and activeX controls.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that in alternative implementations, some functions and/or steps described in some parts of this application might be performed on an order that is different than that presented here. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. In a grid-based computing system, a method of providing data for use by engines in providing computations, the method comprising:
   identifying, at a data provider director, a first data provider based on the first data provider being pingable in at least one of a same location or a failover location of a data requesting-engine;
   receiving, using a first processor, at the first data provider, a request from the data-requesting-engine for data;
   checking, using the first processor, a first local cache associated with the first data provider for the data;
   providing, using the first processor, the data to the data requesting-engine from the first local cache when the data is present in the first local cache;
   requesting, using the first processor, for the data provider director to provide for a second data provider in a preferred lookup location when the data is not present in the first local cache;
   receiving, using the first processor, at the first data provider, notification of the second data provider and forwarding the request to the second data provider;
   providing, using a second processor, the data to the data requesting-engine from a second local cache associated with the second data provider when the data is present in the second local cache; and
   providing, using a third processor, the data to data requesting-engine from a data source only when the data is not present in at least one of the first and second local cache so that the data is retrieved over the network from amongst a plurality of data providers at most once and network calls are minimized.

2. The method of claim 1 wherein the checking of the first local cache further comprises:
   determining, using the first processor, if the data is present in an internal cache; and
   checking, using the processor, a local external cache for the data when the data is not present in the internal cache.

3. The method of claim 1 wherein identifying, at the data provider director, further comprises identifying, at the data provider director, the data source.

4. The method of claim 1 further comprising obtaining, using a processor, a lease for the data source when the data source is single-threaded.

5. A computer program product for use in a grid-based computing system, the computer program product including a non-transitory medium with computer program code embodied thereon, the computer program code comprising:
   instructions for identifying a first data provider based on the first data provider being pingable in at least one of a same location or a failover location of a data requesting-engine;
   instructions for receiving, at the first data provider, a request from the data requesting-engine for data;

instructions for checking a first local cache associated with the first data provider for the data;

instructions for providing the data to the data requesting-engine from the first local cache when the data is present in the first local cache;

instructions for requesting for the data provider director to provide for a second data provider in a preferred lookup location when the data is not present in the first local cache;

instructions for receiving, at the first data provider, notification of the second data provider and forwarding the request to the second data provider;

instructions for providing the data to the data requesting-engine from a second local cache associated with the second data provider when the data is present in the second local cache; and instructions for providing the data to the data requesting-engine from a data source only when the data is not present in at least one of the first and second local cache so that the data is retrieved over the network from amongst a plurality of data providers at most once and network calls are minimized.

6. The computer program product of claim 5 wherein the instructions for checking further comprise:

instructions for determining if the data is present in an internal cache; and instructions for checking an external cache for the data when the data is not present in the internal cache.

7. The computer program product of claim 5 wherein the instructions for identifying the data provider further comprise instructions for identifying the data source.

8. The computer program product of claim 5 wherein the computer program code further comprises instructions for obtaining a lease for the data source when the data source is single-threaded.

9. Apparatus for distributing data in a grid-based computing system, the apparatus comprising:

means for identifying, at a data provider director, a first data provider based on the first data provider being pingable in at least one of a same location or a failover location of a data requesting-engine;

means for receiving, at the first data provider, requests from the data requesting-engine for data;

means for maintaining and accessing a first local cache for the data at the first data provider;

means for providing the data to the data requesting-engine from the first local cache when the data is present in the first local cache;

means for requesting for the data provider director to provide for a second data provider in a preferred lookup location when the data is not present in the first local cache;

means for receiving, at the first data provider, notification of the second data provider and forwarding the request to the second data provider;

means for providing the data to the data requesting-engine from a second local cache associated with the second data provider when the data is present in the second local cache; and means for providing the data to the data requesting-engine from a data source only when the data is not present in at least one of the first and second local cache so that the data is retrieved over the network from amongst a plurality of data providers at most once and network calls are minimized.

10. The apparatus of claim 9 wherein the first and second local cache comprises at least one of:

an internal cache; and a local external cache.

11. The apparatus of claim 9 further comprising means for obtaining a lease for the data source when the data source is single-threaded.

12. A system for providing data for use in grid-based computations, the system comprising:

a first data provider having associated therewith a first local cache;

a second data provider having associated therewith a second local cache;

a network interconnecting the first and second data providers; and a data provider director interconnected to the network and configured to identify the first data provider as a potential provider of data, the identification based on the first data provider being pingable in at least one of a same location or a failover location of a data requesting-engine, and identify the second data provider as a potential provider of the data when the data is not present in the first local cache, the identification based on the second data provider being in a preferred lookup location, wherein the first data provider is configured to receive a request from the data-requesting engine for the data, check the first local cache for the data and provide the data to the data-requesting engine when the data is present in the first local cache, wherein the first data provider is further configured to request for the data provider director to identify the second data provider when the data is not present in the first local cache, receive notification of the second data provider from the data provider director and forward the request to the second data provider, wherein the second data provider is configured to provide the data to the data-requesting engine when the data is present in the second local cache, and wherein the data is provided to the data requesting-engine from a data source only when the data is not present in at least one of the first and second local cache so that the data is retrieved over the network from the plurality of data providers at most once and network calls are minimized.

13. The system of claim 12 wherein the first and second local cache further comprises at least one of:

an internal cache disposed internally to each data provider; and a local external cache connected to and associated with each data provider.

14. The system of claim 13 wherein the local external cache is associated with at least two data providers.

15. The system of claim 14 wherein the network comprises a wide area network, and wherein the local external cache is connected to the at least two data providers by a local area network.

* * * * *